United States Patent

Raab et al.

[11] Patent Number: 5,850,397
[45] Date of Patent: Dec. 15, 1998

[54] METHOD FOR DETERMINING THE TOPOLOGY OF A MIXED-MEDIA NETWORK

[75] Inventors: Ilan Raab, Sunnyvale; Nam N. Nguyen, Fremont; Ai-Lan Chang, Fremont; Gilbert D. Ho, Saratoga; Guruprasad S. Hadagali, Sunnyvale, all of Calif.

[73] Assignee: Bay Networks, Inc., Santa Clara, Calif.

[21] Appl. No.: 630,384

[22] Filed: Apr. 10, 1996

[51] Int. Cl.[6] .............................. H04L 12/28; H04L 12/56
[52] U.S. Cl. .......................... 370/392; 370/389; 370/400; 370/254; 370/257; 1/1
[58] Field of Search ..................................... 370/389, 392, 370/401, 407, 410, 395, 254, 257, 400; 395/183.01; 1/1

[56] References Cited

U.S. PATENT DOCUMENTS 5,606,664  2/1997  Brown et al. ............................ 370/407
5,684,796  11/1997  Abidi et al. ............................. 370/392
5,684,959  11/1997  Bhat et al. ............................... 1/1
5,708,772  1/1998  Zeldin et al. ...................... 395/183.01

*Primary Examiner*—Wellington Chin
*Assistant Examiner*—Melissa Kay Carman
*Attorney, Agent, or Firm*—Blakely, Sokoloff, Taylor & Zafman LLP

[57] ABSTRACT

A method for determining the topology of a mixed-media network is provided. According to the method, the network is divided into communities of devices that support a common topology mechanism ("spheres"). On each sphere, one or more sphere topology agents generate and accumulate topology data for the devices on the sphere using the topology mechanism that is supported by the devices within the sphere. A global topology agent collects the topology data for each sphere from the various sphere agents and assembles the data to determine the global topology of the mixed-media network. The global topology agent begins by collecting data from a current sphere and identifies additional spheres based on data stored in boundary devices within the current sphere. The global topology agent then repeats the same process with the additional spheres until topology data has been collected from all of the spheres in the mixed-media network.

11 Claims, 7 Drawing Sheets

PHYSICAL TOPOLOGY     VIRTUAL OVERLAY

text …

METHOD FOR DETERMINING THE TOPOLOGY OF A MIXED-MEDIA NETWORK

FIELD OF THE INVENTION

The present invention relates to determining the topology of network systems, and more specifically, to a method and apparatus for determining the topology of a mixed-media network.

BACKGROUND OF THE INVENTION

Various approaches have been developed for allowing computers to communicate with each other. Each approach involves a particular network paradigm, and communication protocols that allow devices to communicate according to the paradigm. Network paradigms and their associated protocols are referred to herein as a "network media". Two general categories of network media in common use today include frame switched networks and cell switched networks. Frame switched networks include Ethernet networks, token ring networks, and FDDI networks. Cell switched networks include Asynchronous Transfer Mode (ATM) networks.

It is becoming increasingly common for different types of networks to be connected with each other to form larger "global" networks. Without a clear and accurate view of the underlying physical topology of the global network, it is difficult to produce intelligent management systems for the overlying virtual (logical) topology of the network. For example, if the topology of the global network (the "global topology") cannot be determined, then various network managers and applications will be unable to assess the ramification of switching a port from one workgroup to another. In addition, network management software may not be able to display accurate information.

AUTOMATED TOPOLOGY DETERMINATION

Techniques have been developed for automatically determining how devices within a network are connected to each other. U.S. Pat. No. 5,226,120, entitled "Apparatus and Method of Monitoring the Status of a Local Area Network" issued to Brown et al. on Jul. 6, 1993, describes one automatic topology determination approach that includes four phases: topology message generation, topology data storage, topology data collection and topology calculation. The topology message generation phase involves causing network management modules and bridges to send special topology messages called "hello" messages. Hello messages are multicast on a predetermined multicast address and are used to advertise that the device sending the message exists. During topology data storage, the hello messages are collected by all network management modules, which make them available via SNMP protocol to a topology process. During topology data collection, the topology process collects the topology information from all the network management modules. During topology calculation, the topology process processes the retrieved topology information to determine how the various devices that transmitted the special messages are connected to each other.

GLOBAL TOPOLOGY DETERMINATION

Unfortunately, the topology determination mechanism described above is not easily scaled to larger networks or to networks that contain multiple types of network media ("mixed-media networks"). With respect to the size of a global network, the number of "hello" messages flowing through the network will increase dramatically as the size of the global network increases. Consequently, as the size of the global network increases, it quickly becomes unfeasible to support the traffic and overhead required for automatic-topology determination.

With respect to mixed-media networks, the micro-segmentation model of switching devices does not fit well with the shared-media based topology discovery process used by network management modules. Specifically, each switch in a cell switched network may support a large number of virtual connections. Consequently, the amount of traffic that would be generated by sending "hello" messages between switching devices could have a significant impact on the performance of the network. In addition, there are no definitions as to how switching devices should behave and how they can coexist (from a topological sense) with existing shared media networks. For example, FIG. 1 illustrates a global network 100 whose topology cannot be easily determined by the discovery techniques described above. Global network 100 includes a plurality of hubs 102–120, a router 121 and two switching communities 122 and 124. It is not clear how the switching communities 122 and 124 should participate in the topology conversation, how the switching communities 122 and 124 are discovered, or how the switching communities 122 and 124 are to be placed in the global topology.

Based on the foregoing, it is clearly desirable to provide a global topology discovery model that may be applied to global networks that include switching communities in addition to the other types of network environments.

SUMMARY OF THE INVENTION

A method and apparatus for determining the topology of a mixed-media network is provided. According to the method, the network is divided into communities of devices that support a common topology mechanism ("spheres"). On each sphere, one or more sphere topology agents generate and accumulate topology data for the devices on the sphere using the topology mechanism that is supported by the devices within the sphere.

A global topology agent collects the topology data for each sphere from the various sphere agents, and assembles the data to determine the global topology of the mixed-media network. The global topology agent begins by collecting data from a current sphere and identifies additional spheres based on data stored in boundary devices within the current sphere. The global topology agent then repeats the same process with the additional spheres until topology data has been collected from all of the spheres in the mixed-media network.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

TERMINOLOGY

Figure 1:
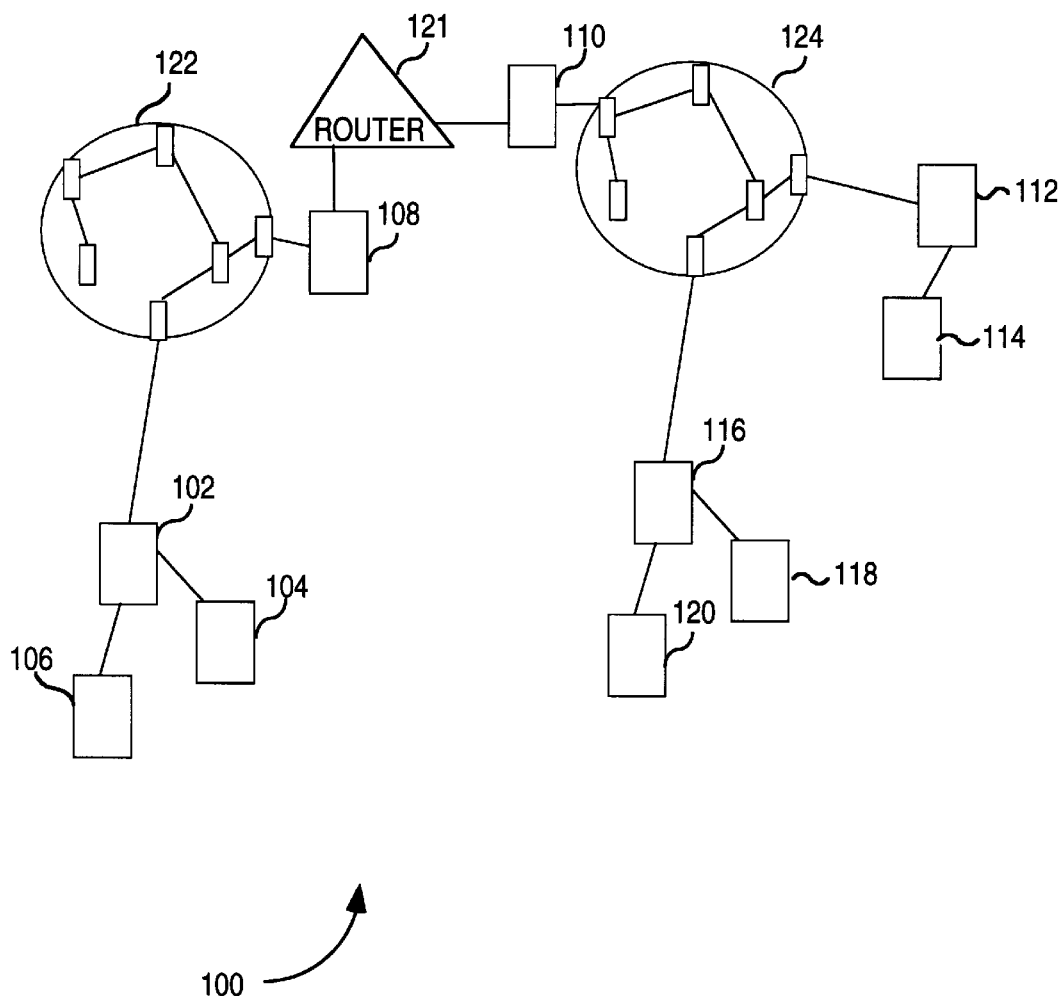
FIG. 1 is a drawing of a mixed-media network that includes Ethernet groups and ATM communities.

The following terms shall be used in the description set forth below.

A "sphere" is a set of devices (along with some or all of their links) which (1) implement a common topology mechanism, (2) bound the topology mechanism within that set, and (3) contain enough information to derive the topology of the devices in the set. For example, a set of interconnected devices that communicate with each other according to Ethernet topology protocol would constitute an Ethernet sphere. Further, all directly connected routers belong to the a "Router Sphere". Like other media-specific spheres, the router sphere has its own Sphere Agent and a Sphere Topology Mechanism.

A "sphere mechanism" is a topology mechanism by which the devices within a sphere interact in order to determine the topology of the sphere. For example, the "hello" messages described hereafter may be the sphere mechanism for a sphere associated with an Ethernet network media.

A "boundary device" for a specific sphere is a device that (1) exists within multiple spheres, and (2) has interfaces to at least two adjacent spheres. The type of devices that will constitute boundary devices for a sphere depend on the type of network that is associated with the sphere. Specifically, the boundary devices of a sphere associated with an Ethernet network may include 28K devices with feeder ports, routers with Ethernet interfaces and EtherCells. The boundary devices of a sphere associated with a token ring network may include token ring switching devices and routers. The boundary devices of a sphere associated with an FDDI network may include routers. The boundary devices of a sphere associated with an ATM network may include routers with ATM interfaces and EtherCells. The boundary devices of a sphere associated with a 28K community may include 28K devices with feeder ports. The boundary devices for a router sphere include routers.

A "sphere agent" is a topology agent which is associated with a specific sphere. The sphere agent of a sphere employs the sphere mechanism to generate and collect connectivity information about the sphere to which it belongs.

Table 1 shows the particular sphere components for various types of spheres.

TABLE 1

| Sphere | Sphere Agent | Sphere Mechanism | Sphere Devices | Boundary Devices |
|---|---|---|---|---|
| Ethernet | Ethernet Topology Process | SynOptics ™ Network Management Protocol (SONMP) Frames | Ethernet network management modules Ethernet Host Modules Ethernet Bridges Ethernet Switch Engines (ESEs) | 28K with feeder ports Routers with Ethernet interfaces Ethercells |
| Token Ring | Token Ring Topology Process | SONMP Frames | TR network management modules TR Host Modules TR Bridges | Routers |
| FDDI | FDDI Topology Process | SMT | FDDI network management modules FDDI Host Modules | Routers |
| ATM | Call Management System (CMS) & MultiCast Server (MCS) | CMS<->SMC Protocol | All ATM switches managed by one CMS | EtherCells ATM interfaces of routers |
| 28K | Master 28K Agent (M2) | 28K LattisSpan Network Management Protocol (LSNMP) | Non-master 28K agent (M1), M2 | 28K with feeder ports |
| Router | Router topology or NM platform | Routing Information Protocol (RIP), Open Shortest Path First (OSPF), etc. | Routers | Routers |

OVERVIEW

The present invention provides a system and method for determining the topology of mixed-media global networks. According to one embodiment of the invention, the topology of a global network is determined in four phases: sphere determination, sphere topology determination, sphere topology data collection and global topology determination.

During sphere determination, the global network is partitioned based on network media type into a set of local, manageable topology communities ("spheres"), with a defined mechanism for navigation between spheres for discovery and placement. During sphere topology determination, one or more sphere agents are used to determine the topology of each individual sphere. During sphere topology data collection, each sphere provides a specific set of topology information to a Global Topology Agent. During global topology determination, the Global Topology Agent assembles the global topology based on the sets of topology information received from the various individual spheres and information about how the spheres are connected to each other.

GUIDELINES

The topology determination mechanism described herein is loosely constrained by a set of guidelines for sphere behavior. By designing the topology mechanisms according to the guidelines, the traffic that is generated in one sphere to determine the topology of the sphere is isolated from other spheres. Consequently, the devices in one sphere do not have to support the type of messages used to determine the topology of another sphere. In addition, the overall bandwidth requirements of the global topology determination process are significantly reduced.

According to the guidelines, each device in the global network must belong to at least one sphere. Boundary devices belong to two or more spheres. Each sphere must have at least one Sphere Agent. The Sphere Agents for a particular Sphere generate and collect the topology information for the Sphere. According to one embodiment of the invention, the topology information includes discovery and connectivity information, virtualization information, configuration information, and end device attachment information (Port/Address association).

Preferably, the Sphere Agents provide the sphere topology information to the Global Topology Agent using SNMP MIBs. In addition, it is desirable for the Sphere Agents to include a mechanism for signaling to the Global Topology Agent that the topology of the sphere to which they belong has changed (e.g. a timestamp of when the latest change occurred).

Boundary Devices within a given sphere must be able to provide sufficient navigation information for the spheres that are adjacent to the given sphere to be identified. In addition, the boundary devices are configured to block messages that are used in the sphere topology determination process from crossing between spheres. Further, the boundary devices participate in the sphere topology determination process for each Sphere to which the boundary devices belong.

Within each sphere, each addressable agent is configured to provide information about the Location of its Sphere Agent (e.g. the IP address of the Sphere Agent of the sphere to which it belongs). In addition, each addressable agent is able to provide data (e.g. the Chassis ID) that identifies the physical entity in which the agent resides.

EXEMPLARY GLOBAL NETWORK

Figure 3:
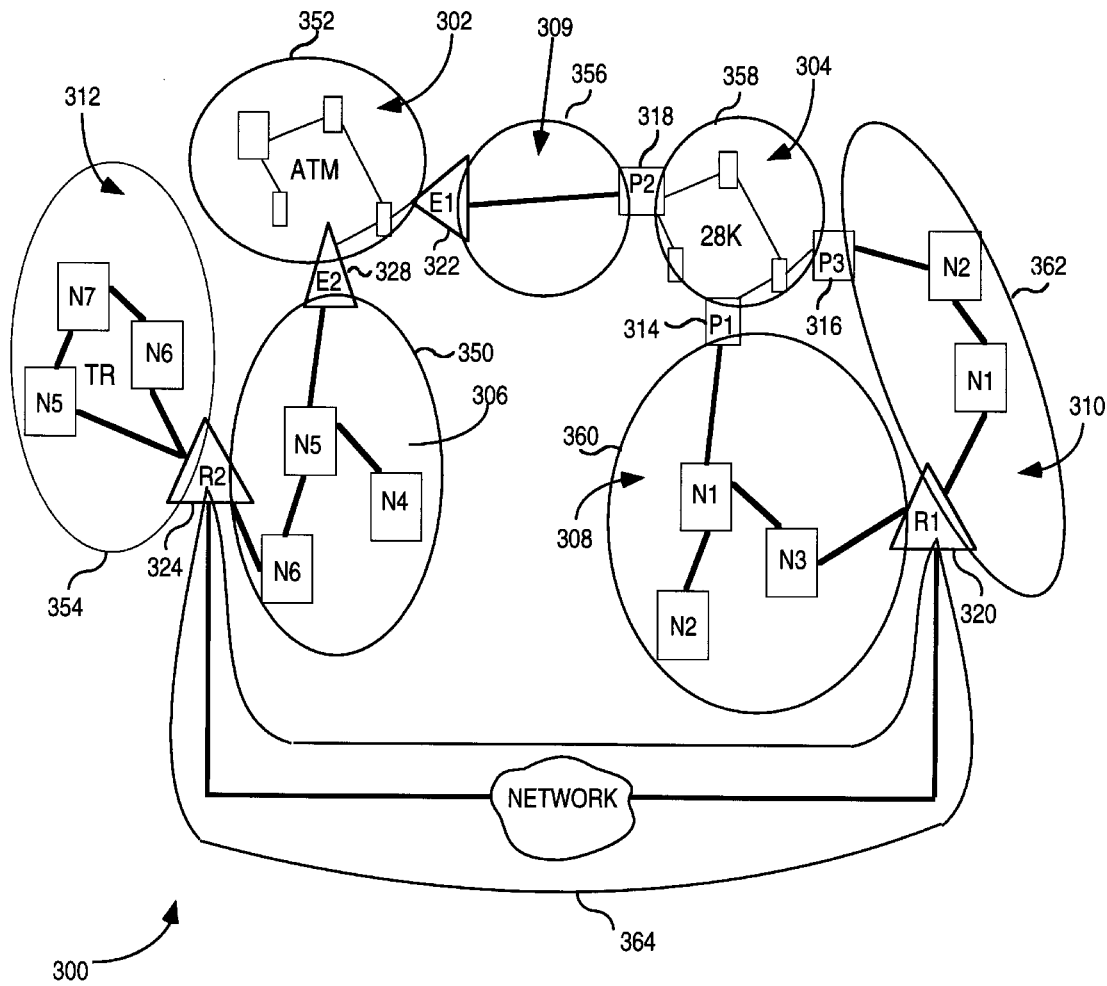
FIG. 3 illustrates an exemplary mixed-media network that has been divided into spheres.

FIG. 3 is a block diagram of an exemplary global network 300 on which the global topology determination process described herein may be performed. Network 300 includes an ATM domain 302, a 28K community 304, a plurality of Ethernet networks 306, 308, 309 and 310, and a token ring network 312. Ethernet network 309 consists of an EtherCell 322 that communicates to a 28K device with feeder ports 318 according to Ethernet topology protocol.

An EtherCell 328 connects the ATM domain 302 with Ethernet network 306. A router 324 connects token ring network 312 to Ethernet network 306. A 28K feeder 314 connects the 28K community 304 to Ethernet network 308. A 28K feeder 316 connects the 28K community 304 to Ethernet network 310. Ethernet network 308 is connected to Ethernet network 310 through a router 320. Routers 324 and 320 are directly connected through a Wide Area Network (WAN) link, and therefore constitute a router network.

SPHERE DETERMINATION

Figure 2:
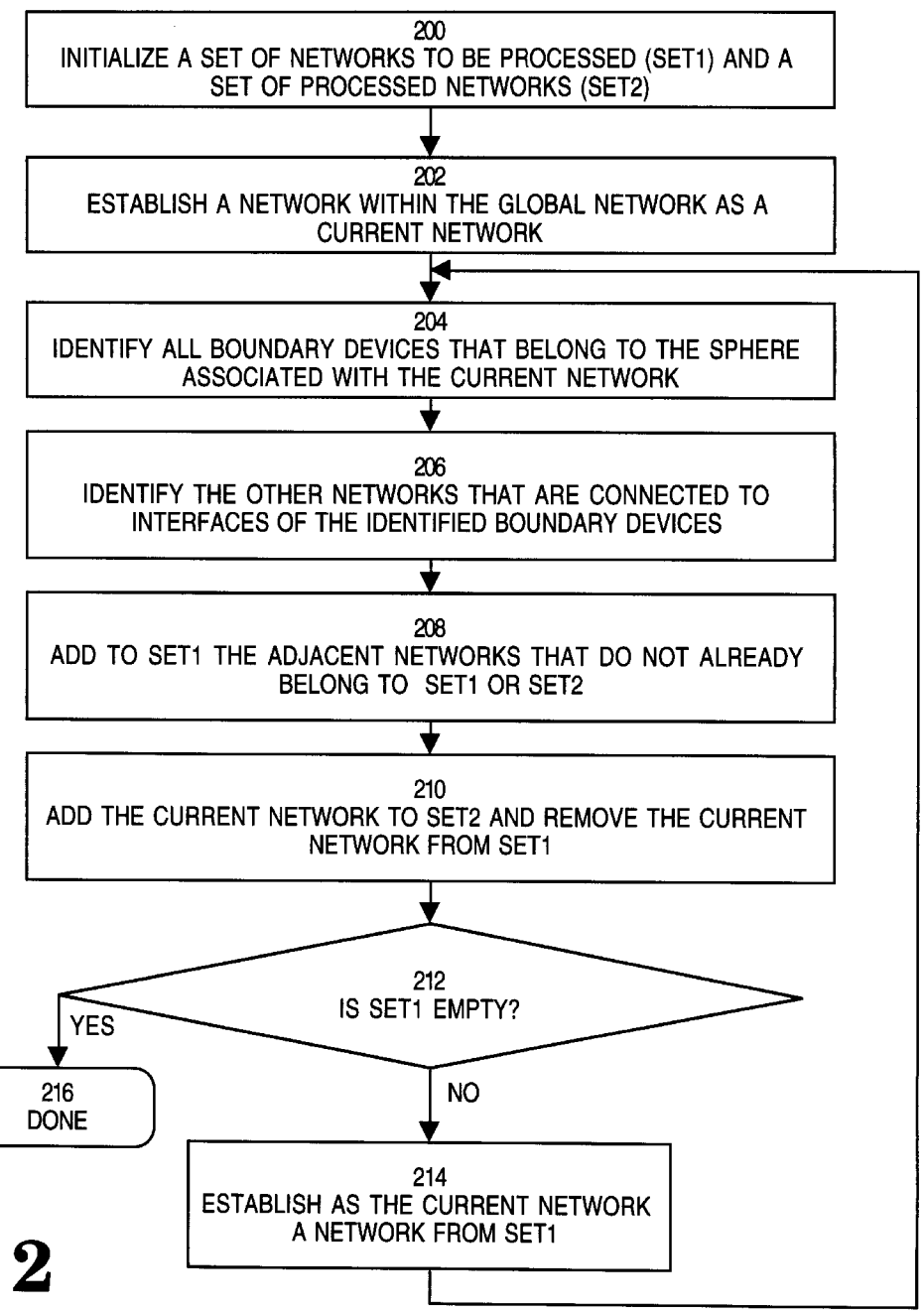
FIG. 2 is a flow chart illustrating the steps for identifying spheres within a global network according to an embodiment of the invention.

As mentioned above, the global network is divided into spheres based on the network media communities within the global network. FIG. 2 is a flow chart that illustrates the general steps performed to divide a global network into spheres according to one embodiment of the invention. In general, the process involves starting in one sphere, finding all of the boundary devices within the sphere, identifying other spheres based on information stored in the boundary devices, and repeating the same process for all of the newly identified spheres. The process illustrated in FIG. 2 shall be described below with reference to the exemplary network 300 shown in FIG. 3.

Referring to FIG. 2, two sets are initialized at step 200. The first set ("SET1") includes the identity of networks that have been discovered but not yet processed, and the second set ("SET2") includes the identities of networks that have been discovered and processed. Initially, the two sets are empty. At step 202, a network within the global network is established as a "current network". For the purposes of explanation, it shall be assumed that Ethernet network 306 is selected to be the current network.

At step 204, all of the boundary devices in the sphere associated with the current network are identified. Based on the definitions given above, a sphere 350 associated with Ethernet network 306 includes all of the devices in Ethernet network 306, EtherCell 328 and router 324. In addition, EtherCell 328 and router 324 are the boundary devices that belong of the sphere 350 because both EtherCell 328 and router 324 have interfaces that are connected to devices that do not belong to sphere 350.

At step 206, the other networks that are connected to the interfaces of the identified boundary devices are identified. In the present example, token ring network 312 is connected to an interface of router 324. ATM domain 302 is connected to an interface of EtherCell 328. In addition, an interface of router 324 is involved in the router network consisting of routers 324 and 320. The networks that are connected to boundary devices of the sphere associated with the current network are referred to as "adjacent networks".

At step 208, the adjacent networks that do not already belong to SET1 or SET2 are added to SET1. In the present example, both SET1 and SET2 are currently empty. Therefore token ring network 312, the router network and ATM domain 302 are added to SET1.

At step 210, the current network is added to SET2 and removed (if necessary) from SET1.In the present example, step 210 is performed by adding Ethernet network 306 to SET2.Ethernet network 306 does not need to be removed from SET1 because Ethernet network 306 was never placed in SET1.

At step 212, it is determined whether SET1 is empty. If SET1 is empty, then the sphere identification process is done (step 216). Otherwise, the process described above is repeated for each of the networks identified in SET1. In the present example, SET1 is not empty. Therefore, at step 214, a network that belongs to SET1 is established as the current network and control returns to step 204. In the present example, it shall be assumed that ATM domain 302 is established as the new current network.

At step 204, all of the boundary devices of the sphere 352 that is associated with ATM domain 302 are identified. In the present example, the boundary devices of sphere 352 include EtherCell 328 and EtherCell 322. At step 206, The other networks that are connected to interfaces of the identified boundary devices are identified. In the present example, Ethernet network 306 and Ethernet network 309 are connected to the identified boundary devices.

At step 208, the adjacent networks that do not already belong to SET1 or SET2 are added to SET1. In the present example, Ethernet network 306 already belongs to SET2. Therefore, only Ethernet network 309 is added to SET1 during step 208. At step 210, the current network (ATM domain 302) is added to SET2 and removed from SET1.

At step 212, it is determined whether SET1 is empty. In the present example, SET1 is not empty. Therefore, at step 214, a network that belongs to SET1 is established as the current network and control returns to step 204. In the present example, it shall be assumed that token ring network 312 is established as the new current network.

At step 204, all of the boundary devices of the sphere 354 that is associated with token ring network 312 are identified. In the present example, the boundary devices of sphere 352 include router 324. At step 206, The other networks that are connected to interfaces of the identified boundary devices are identified. In the present example, Ethernet network 306 and the router network are the only networks connected to the identified boundary devices.

At step 208, the adjacent networks that do not already belong to SET1 or SET2 are added to SET1. In the present example, Ethernet network 306 already belongs to SET2, and the router network already belongs to SET1. Therefore, no networks are added to SET1 during step 208. At step 210, the current network (token ring network 312) is added to SET2 and removed from SET1.

At step 212, it is determined whether SET1 is empty. In the present example, SET1 is not empty. Therefore, at step 214, a network that belongs to SET1 is established as the current network and control returns to step 204. In the present example, it shall be assumed that Ethernet network 309 is established as the new current network.

At step 204, all of the boundary devices of the sphere 356 that is associated with Ethernet network 309 are identified. In the present example, the boundary devices of sphere 356 include EtherCell 322 and 28K device with feeder ports 318. At step 206, The other networks that are connected to interfaces of the identified boundary devices are identified. In the present example, ATM domain 302 and 28K community 304 are the networks connected to the identified boundary devices.

At step 208, the adjacent networks that do not already belong to SET1 or SET2 are added to SET1. In the present example, ATM domain 302 already belongs to SET2. Therefore, no networks are added to SET1 during step 208. At step 210, the current network (Ethernet network 309) is added to SET2 and removed from SET1.

At step 212, it is determined whether SET1 is empty. In the present example, SET1 is not empty. Therefore, at step 214, a network that belongs to SET1 is established as the current network and control returns to step 204. In the present example, it shall be assumed that the 28K community 304 is established as the new current network.

At step 204, all of the boundary devices of the sphere 358 that is associated with 28K community 304 are identified. In the present example, the boundary devices of sphere 358 include feeder devices 314, 316 and 318. At step 206, The other networks that are connected to interfaces of the identified boundary devices are identified. In the present example, Ethernet network 309, Ethernet network 308 and Ethernet network 310 are connected to the identified boundary devices.

At step 208, the adjacent networks that do not already belong to SET1 or SET2 are added to SET1. In the present example, Ethernet network 309 already belongs to SET2. Therefore, Ethernet networks 308 and 310 are added to SET1 during step 208. At step 210, the current network (28K community 304) is added to SET2 and removed from SET1.

At step 212, it is determined whether SET1 is empty. In the present example, SET1 is not empty. Therefore, at step 214, a network that belongs to SET1 is established as the current network and control returns to step 204. In the present example, it shall be assumed that Ethernet network 308 is established as the new current network.

At step 204, all of the boundary devices of the sphere 360 that is associated with Ethernet network 308 are identified. In the present example, the boundary devices of sphere 360 include feeder device 314 and router 320. At step 206, The other networks that are connected to interfaces of the identified boundary devices are identified. In the present example, 28K community 304, Ethernet network 310 and the router network are connected to the identified boundary devices.

At step 208, the adjacent networks that do not already belong to SET1 or SET2 are added to SET1. In the present example, all of the adjacent networks already belong to either SET1 or SET2. Therefore, no new networks are added to SET1 during step 208. At step 210, the current network (Ethernet network 308) is added to SET2 and removed from SET1.

At step 212, it is determined whether SET1 is empty. In the present example, SET1 is not empty. Therefore, at step 214, a network that belongs to SET1 is established as the current network and control returns to step 204. In the present example, it shall be assumed that Ethernet network 310 is established as the new current network.

At step 204, all of the boundary devices of the sphere 362 that is associated with Ethernet network 310 are identified. In the present example, the boundary devices of sphere 362 include feeder device 316 and router 320. At step 206, The other networks that are connected to interfaces of the identified boundary devices are identified. In the present example, 28K community 304, Ethernet network 308 and the router network are connected to the identified boundary devices.

At step 208, the adjacent networks that do not already belong to SET1 or SET2 are added to SET1. In the present example, all of the adjacent networks already belong to either SET1 or SET2. Therefore, no new networks are added to SET1 during step 208. At step 210, the current network (Ethernet network 310) is added to SET2 and removed from SET1.

At step 212, it is determined whether SET1 is empty. In the present example, SET1 is not empty. Therefore, at step 214, a network that belongs to SET1 is established as the current network and control returns to step 204. In the present example, the router network (the only remaining network in SET1) is established as the new current network.

At step 204, all of the boundary devices of the sphere 364 that is associated with the router network are identified. In the present example, the boundary devices of sphere 364 include routers 320 and 324. At step 206, the other networks that are connected to interfaces of the identified boundary devices are identified. In the present example, Ethernet networks 306, 308, and 310 and token ring network 312 are connected to the identified boundary devices.

At step 208, the adjacent networks that do not already belong to SET1 or SET2 are added to SET1. In the present example, all of the adjacent networks already belong to SET2. Therefore, no new networks are added to SET1 during step 208. At step 210, the current network (the router network) is added to SET2 and removed from SET1. At step 212, it is determined that SET1 is empty, and the sphere identification process is completed (step 216).

BOUNDED DISCOVERY

The discovery process described above identifies all of the spheres within a global network. However, under certain circumstances it may be desirable to determine the topology of only a portion of the global network. For example, if the global network is world-wide and consists of thousands of local networks, it would be unfeasible to attempt to determine the topology of the entire global network. However, if one is responsible for an enterprise that consists of multiple local area networks that are connected to the global network, it may be desirable to determine the topology of the networks associated with the enterprise.

To determine the topology of a portion of a global network, the process described above may be easily modified. For example, a third set of networks may be used to identify all of the networks in which a user is interested. Networks identified at step 206 are ignored if they do not belong to the third set. According to an alternate embodiment, a set of outer boundary devices may be maintained. Step 206 may be modified so that only those adjacent networks that are not connected though outer boundary devices are identified.

SPHERE TOPOLOGY DETERMINATION

Each sphere is responsible for maintaining its own topology (physical and virtual) and configuration information. In each of the spheres, the one or more Sphere Agents generate and store the topology and configuration information. The Sphere Agents may use any one of a number of techniques to determine the topology of the sphere in which they reside. Because all of the devices within a sphere support a common network media, the Sphere Agents may employ a media-specific sphere mechanism to generate the topology information.

Examples of sphere topology determination techniques are given below. However, the present invention is not limited to any particular sphere topology determination techniques. Rather, a substantial benefit provided by the present invention is that it is not dependent on the media-specific topology determination techniques used by the Sphere Agents. Consequently, the sphere-based global topology determination process does not need to be modified to account for new types of networks and protocols as long as the Sphere Agents and boundary devices for the new types of networks meet the guidelines expressed herein.

ETHERNET SPHERE TOPOLOGY DETERMINATION

As mentioned above, the techniques used for discovery of a particular sphere may vary based on the type of network associated with the sphere. According to one approach, the Ethernet and token ring sphere discovery techniques both assume that a shared media exists between all devices in the sphere. As a result, the discovery technique relies on multicast messages which are sent by all devices that need to be discovered.

Specifically, network management modules and bridges send special topology messages called "hello" messages. Hello messages are multicast on a predetermined multicast address and are used to advertise that the device sending the message exists. The "hello" messages contain the sending network management module's MAC address, IP, and other information. These packets are collected by all network management modules in the sphere. Each collecting network management module adds the slot and port numbers that the "hello" packets were heard on and then stores them in its topology table. The network management modules make this topology information available in SNMP form to the Global Topology Agent.

TOKEN RING TOPOLOGY DETERMINATION

The "hello" message generation and collection may also be used by Sphere Agents in spheres associated with token ring networks. According to one approach, network management modules send two additional types of hello messages in the token ring sphere discovery process. These messages are used to select a "master network management module". The master network management module stores the complete information pertaining to all the network management modules on the ring.

Non "master" network management modules send "profile" messages that inform the "master" of their status. The master network management module makes all of the topology information available in SNMP form to the Global Topology Agent.

FDDI TOPOLOGY DETERMINATION

"Hello" messages may be used to discover both the logical and physical topology of FDDI networks. Specifically, FDDI network management modules exchange IP and chassis related information using specially defined SMT frames, which are then used to construct the network management module tables used by auto-topology. The logical topology discovery process returns the ordered sequence of stations on the token path using FDDI (SMT) protocols. The physical topology discovery process returns two types of tables: a trunk table which describes the stations on the trunk rings, and child tables which describe how the trees are formed off of the trunks. The physical topology discovery process also uses FDDI SMT protocols but includes processing of additional frame types.

SPHERE TOPOLOGY DATA COLLECTION

During the sphere topology data collection phase, the Global Topology Agent collects the topology data gathered from the Sphere Agents in the various spheres. Depending on the type of sphere, all of the topology data may be available from a single Sphere Agent, or may have to be gathered from multiple Sphere Agents.

According to one embodiment, the one or more Sphere Agents of each sphere make the topology data available in SNMP MIB form to the Global Topology Agent.

Figure 4A:
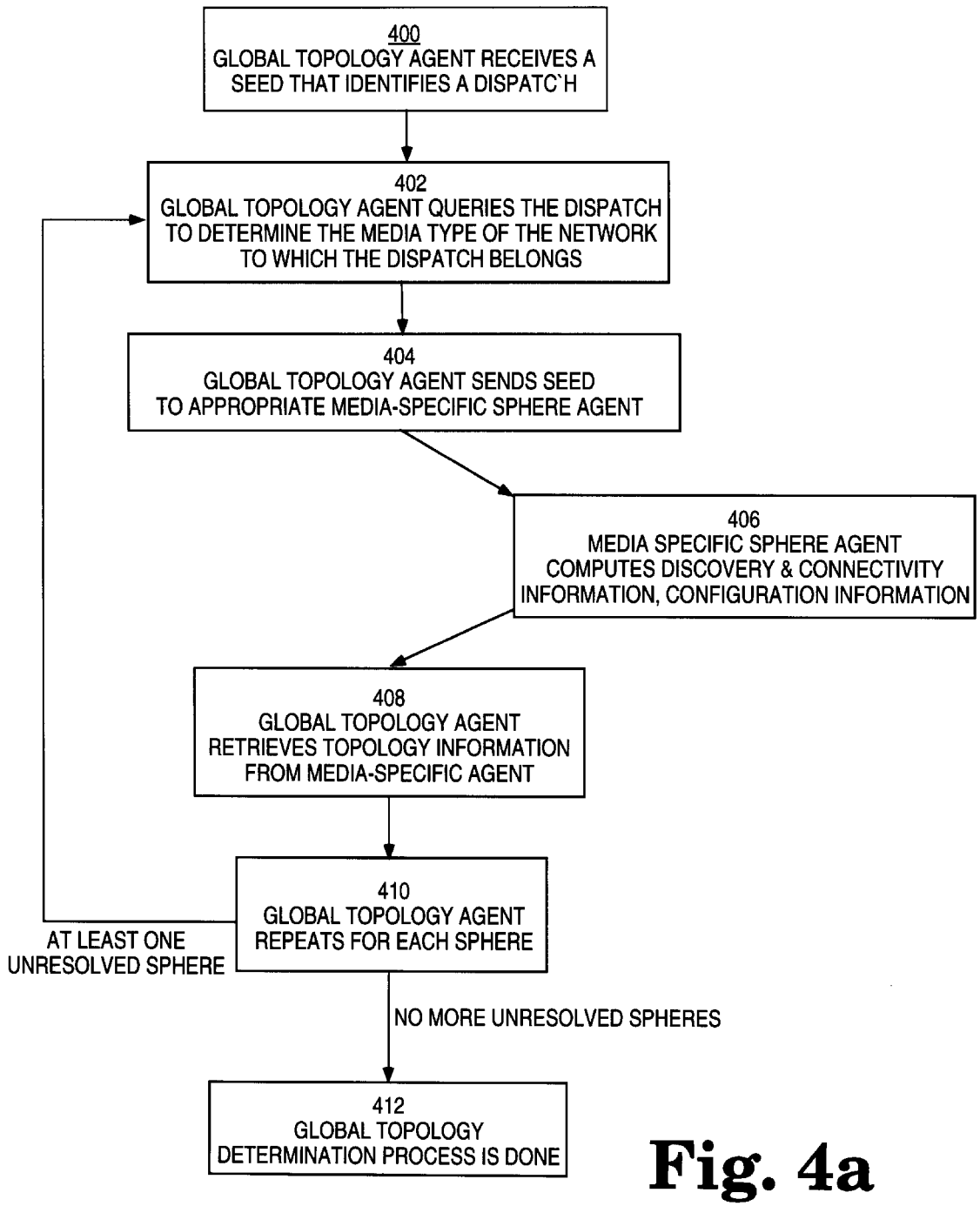
FIG. 4a is a flow chart illustrating the steps of a global topology determination process in which topology data is gathered from each sphere during the sphere identification process.

It should be noted that the present invention is not limited to any particular sequence in the various phases of the global topology determination process. For example, the sphere topology determination phase and the sphere topology data collection phase may be performed during the sphere determination phase. FIG. 4a is a flow chart illustrating a global topology determination process in which the sphere topology determination phase and the sphere topology data collection phase are performed during the sphere determination phase.

Referring to FIG. 4a, the Global Topology Agent is receives a seed (e.g. an IP address) that identifies a device (a "dispatch") in a network (step 400). At step 402, the Global Topology Agent queries the dispatch to determine the media type of the network to which the dispatch belongs. At step 404, the Global Topology Agent sends the seed to the appropriate media-specific Sphere Agent. At step 406, the media-specific Sphere Agent computes discovery, connectivity and configuration information for the sphere.

At step 408, the Global Topology Agent retrieves topology information from the media-specific Sphere Agent. At step 410, the Global Topology Agent repeats the process described above for each sphere in the global network. The global determination process is finished when the topology information has been retrieved for all spheres (step 412).

Figure 4B:
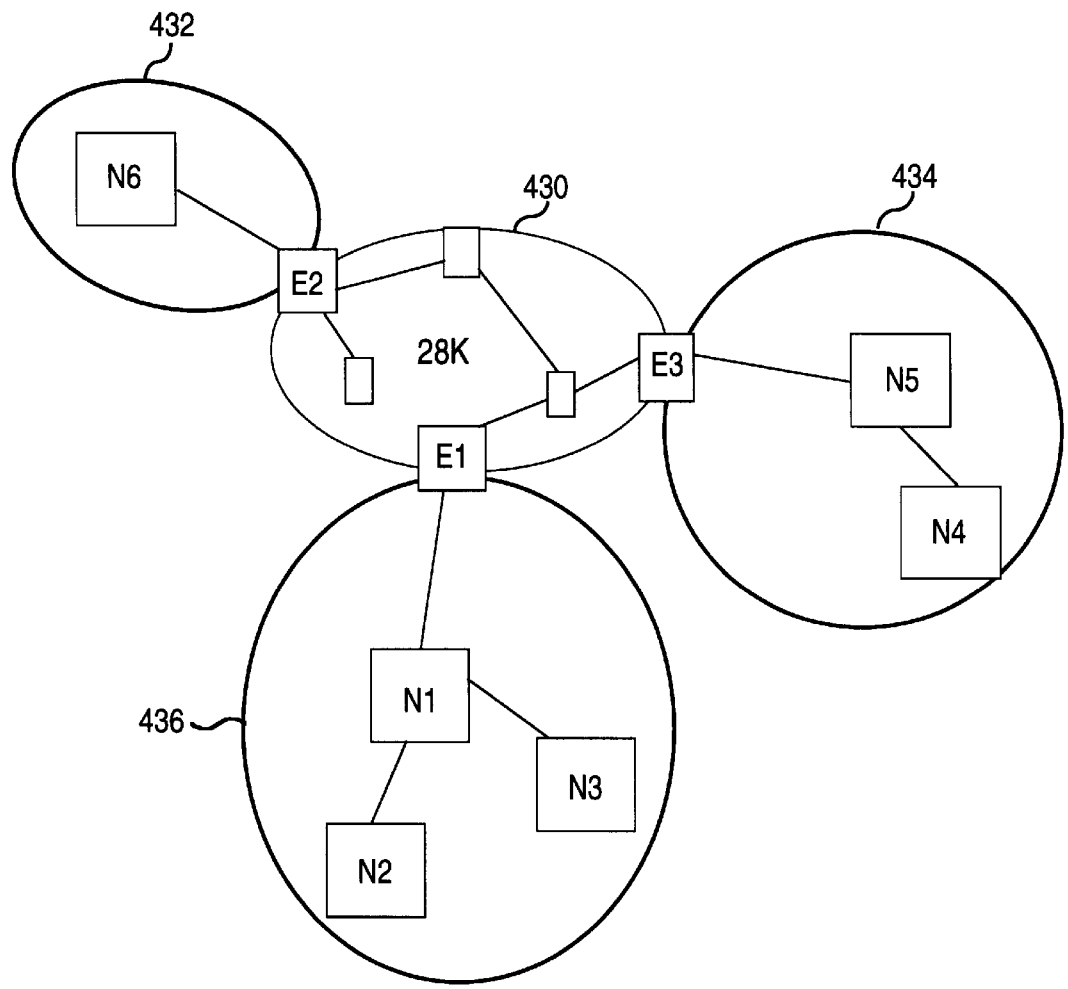
FIG. 4b illustrates an exemplary mixed-media global network on which the process illustrated in FIG. 4a may be performed.

FIG. 4b illustrates an exemplary network that includes a 28K community 430 and several attached Ethernet segments 432, 434 and 436. If the process illustrated in FIG. 4a were applied the network of FIG. 4b, the process might proceed as follows:

1] node N1 may be selected, at random, as a dispatch.

2] Since N1 is an Ethernet network management module, the Global Topology
Agent determines that the an Ethernet Sphere Agent is the appropriate Sphere Agent.

3] The Global Topology Agent passes the IP address of N1 to the Ethernet
Sphere Agent and instructs the Ethernet Sphere Agent to figure out the topology of the Ethernet Sphere.

4] The Ethernet Sphere Agent discovers and locates nodes N1, N2, N3 and E1. The Ethernet Sphere Agent is not aware that E1 is actually a 28K switch.

5] The Global Topology Agent scans the discovered network management modules to discover that E1 is a 28K switch 6] The Global Topology Agent process asks E1 for the identity of the M2 for the 28K community 430 to which E1 belongs. The M2 is located and the internal 28K community physical topology is transmitted from the M2 to the Global Topology Agent. As a result, E2 and E3 are discovered.

7] The IP address of E3 is given to the Ethernet Sphere Agent as a dispatch.

The Ethernet Sphere Agent discovers E3, N4 and N5 and figures out the correct links. Note that E3 has the same SNMP Topology tables as a network management module.

8] Phase 7 is duplicated for E2

GLOBAL TOPOLOGY DETERMINATION

The Global Topology Agent combines all media-specific topologies and presents one topology map. According to one embodiment, the Global Topology Agent builds a Global Physical Topology Table from the combined topology information from all the spheres, and makes the Global Physical Topology Table accessible using a superset SNMP MIB which encompasses all media types.

The Global Topology Agent is able to provide physical topology by merging the logical topologies across their physical containment. This is possible because the Sphere Agents provide the physical location of every device within a Sphere. For example, a single network device may contain both Ethernet and token-ring host modules. Both the Ethernet and token-ring host modules will point to the same chassis serial number as their physical location. This information will then be used by the Global Topology Agent to determine that the Ethernet and token-ring host modules are part of the same physical device.

Figure 5:
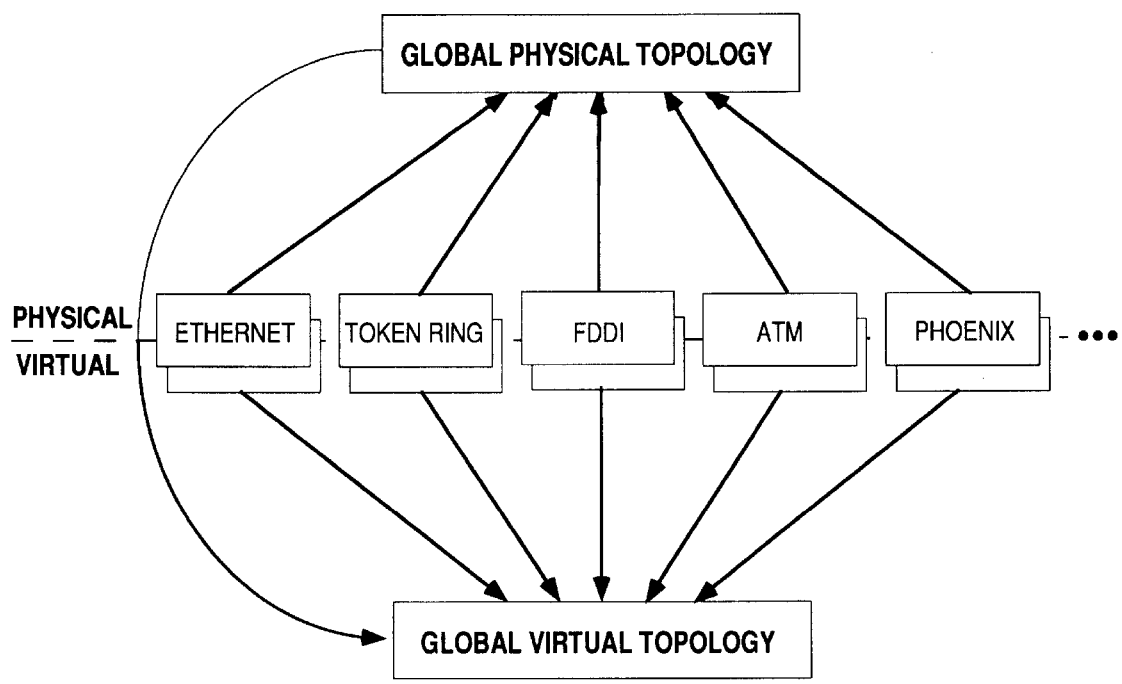
FIG. 5 illustrates physical and virtual topology information.

As mentioned above, every Sphere Agent provides both the physical and the virtual topology of its sphere. Virtual Topology is defined as a filter applied over Physical Topology. That filter defines multicast domains within either a switched or mixed internetworks. FIG. 5 is a system diagram that illustrates a Global Virtual Topology process which retrieves the virtual topology information from each of the Sphere Agents and, together with the information provided by the Global Physical Topology agent, constructs a Global Virtual Topology representation of the network. The virtual topology view is similar to the physical topology view but represents the virtual topology of a network.

Figure 6:
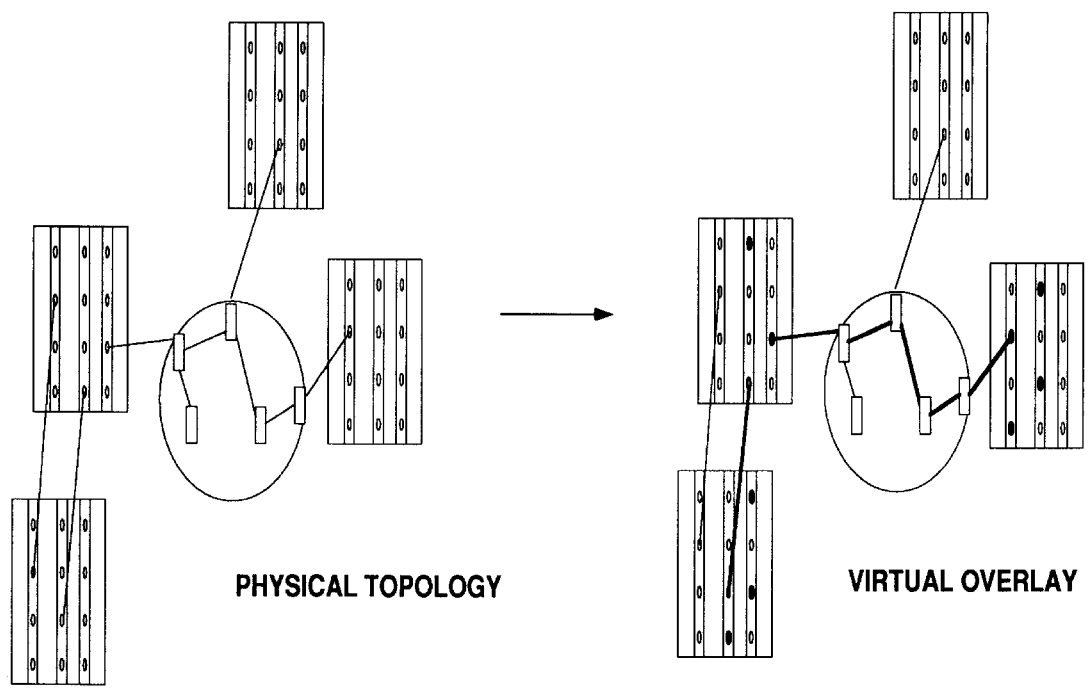
FIG. 6 illustrates how virtual topology information may be used as an overlay on the physical topology to present a logical view of the network.

FIG. 6 is an example of virtual topology overlay. The physical topology shows a switching device connected to several frame switched type hubs. The virtual topology shows the same topology, but highlights the workgroup connectivity that is forced by the configurations of the switch and hubs.

REQUIREMENTS ACCORDING TO ONE IMPLEMENTATION

As mentioned above, the various components that participate in the global topology determination process described herein are constrained by a set of loose guidelines that are set forth above. According to one embodiment of the invention, these guidelines may be satisfied by satisfying the requirements set forth below. It should be noted that these requirements correspond to a specific implementation of the invention and are therefore merely exemplary.

Non Boundary Interface Requirements

Table 2 illustrates interface-level requirements for all addressable devices that participate in topology.

TABLE 2

| # | Interface | Requirement (Non Boundary) |
|---|---|---|
| 1 | Ethernet | •Send network management module Flatnet & Segment hello messages<br>•For any Multi-segment devices and all new devices: Support the Ethernet Multi-Segment Topology MIB.<br>•For current, Uni-segment devices: Support the 3K Ethernet topology MIB<br>•Provide connectivity to Sphere Agent |

TABLE 2-continued

| # | Interface | Requirement (Non Boundary) |
|---|---|---|
| 2 | Token Ring | •Send network management module Flatnet & Segment hello messages (+TR specific hello)<br>•Maintain network management module and Bridge topology tables + extension tables<br>•Provide connectivity to Sphere Agent |
| 3 | FDDI | •Participate in the SMT X.X topology protocol<br>•Maintain FDDI physical topology tables<br>•Maintain FDDI Ring topology table<br>•Provide connectivity to Sphere Agent |
| 4 | ATM | •Provide connectivity information to the ATM Sphere Agent<br>•Participate in the ATM topology mechanism |
| 5 | 28K | •Provide connectivity information to the 28K Sphere Agent<br>•Participate in the 28K topology mechanism |

Table 3 lists the interface requirements for Boundary Devices. Since Boundary Devices belong to at least two Spheres, a boundary device must satisfy the interface requirements of each Sphere to which they belong.

TABLE 3

| # | Interface | Requirement (Boundary) |
|---|---|---|
| 1 | Ethernet | •Send network management module Flatnet & Segment hello messages<br>•For any Multi-segment devices and all new devices: Support the Ethernet Multi-Segment Topology MIB.<br>•For current, Uni-segment devices: Support the 3K Ethernet topology MIB<br>•Provide connectivity to Sphere Agent<br>•Ping default router<br>•Filter all hello messages received |
| 2 | Token Ring | •Send network management module Flatnet & Segment hello messages (+TR specific hello)<br>•Maintain the 5K Token Ring topology MIB + extension tables<br>•Provide connectivity to Sphere Agent<br>•Ping default router<br>•Filter all hello messages received |
| 3 | FDDI | •Participate in the SMT X.X topology protocol<br>•Ping default router<br>•Maintain FDDI physical topology tables<br>•Maintain FDDI Ring topology table<br>•Filter all hello messages received<br>•Provide connectivity to Sphere Agent |
| 4 | ATM | •Provide connectivity information to the ATM Sphere Agent<br>•Participate in the ATM topology mechanism |
| 5 | 28K | •Provide connectivity information to the 28K Sphere Agent<br>•Participate in the 28K topology mechanism |

Tables 4–8 describe requirements for the agents that reside on particular types of devices.

TABLE 4

| # | Interface | Device | Requirement |
|---|---|---|---|
| 1 | Ethr/TR/FDDI | 2K/3K | Provide chassis ID as unique physical identifier |
| 2 | | 2K/3K | Provide address of Sphere Agent via a MIB variable |
| 3 | | 2K/3K | Send appropriate hello or SMT messages |
| 4 | | 2K/3K | Maintain appropriate topology tables |

TABLE 5

| # | Interface | Device | Requirement |
|---|---|---|---|
| 1 | Ethernet | Bridge/kalpana | Send Bridge hello frames from every connected port |
| 2 | | Bridge/kalpana | Filter network management module Flatnet hello messages |
| 3 | | Bridge/kalpana | Forward network management module Segment hello messages |
| 4 | | Kalpana | Maintain the SNMP Ethernet Bridge Topology Table |

TABLE 6

| # | Interface | Device | Requirement |
|---|---|---|---|
| 1 | Ethernet | Leaf 28K | Send network management module Flatnet & Segment hello frames from every connected feeder port |
| 2 | | Leaf 28K | Support the Ethernet Multi-Segment Topology MIB |
| 4 | Phoenix | Leaf 28K | Filter all hello messages received via any feeder port |
| 5 | | Any 28K | Provide address of M2 via SNMP |
| 6 | | M2 | Provide complete physical topology of 28K group |
| 7 | | M2 | Provide domain information (VLAN topology) for 28K group |

TABLE 7

| # | Interface | Device | Requirement |
|---|---|---|---|
| 1 | Ethernet | EtherCell | Send network management module Flatnet & Segment hello frames from every connected port |
| 2 | | EtherCell | Support the Ethernet Multi-Segment Topology MIB |
| 4 | ATM | EtherCell | Filter all hello messages received |
| 5 | | EtherCell | Provide IP address of CMS via SNMP |
| 6 | | CMS | Provide addresses of all directly attached devices Ethercells |
| 7 | | CMS | Provide address of all MCSs connected to its community |

TABLE 8

| # | Interface | Device | Requirement |
|---|---|---|---|
| 1 | Any | Router | Participate in Sphere Mechanism appropriate to this interface |
| 2 | Router | Router | Provide location of other routers within the Router Sphere |

According to one embodiment, the "hello" messages use by the Sphere Agents associated with Ethernet, token ring and FDDI networks have the following format:

| | network management module's IP | Source ID | Chassis Type | Back-plane Type | network management module's State | Number of links (depre-cated) |
|---|---|---|---|---|---|---|
| Bytes | 4 | 3 | 1 | 1 | 1 | 1 |

According to one embodiment, the "hello" messages used by Sphere Agents associated with ATM networks have the following format:

| | network management module's IP | Source ID | Chassis Type | Back-plane Type | network management module's State | Number of links (depre-cated) |
|---|---|---|---|---|---|---|
| Bytes | 4 | 3 | 1 | 1 | 1 | 1 |

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for determining a global topology of a global network, the method comprising the steps of:

partitioning the global network into a plurality of spheres;

determining interconnections between devices within each sphere of said plurality of spheres;

determining intersections between said plurality of spheres; and determining said global topology based on said interconnections between devices within each sphere of said plurality of spheres and said intersections between said spheres.

2. The method of claim 1 wherein the step of partitioning the global network into a plurality of spheres comprises the steps of:

a) establishing a network within said global network as a current network;

b) identifying a boundary device that belongs to said current network;

c) reading connection information stored in the boundary device that identifies a local area network to which said boundary device is connected;

d) establishing said a local area network as said current network; and e) repeating steps b) through d) until all local area networks within said global network have been established as spheres.

3. The method of claim 1 wherein the step of determining interconnections between devices within each sphere of said plurality of spheres comprises the steps of:

determining a network media that is associated with a selected sphere;

selecting a sphere agent that corresponds to said network media;

causing said sphere agent to collect topology data from devices in said sphere; and collecting topology information from said sphere agent.

4. The method of claim 1 wherein the step of determining intersections between said plurality of spheres comprises detecting when a logical device that belongs to a first sphere has an identical physical device identifier as a logical device that belongs to a second sphere.

5. The method of claim 3 wherein the step of causing said sphere agent to collect topology data from devices in said sphere comprises the steps of:

sending special messages between devices that belong to said sphere; and restricting transmission of said special messages to devices that belong to said sphere.

6. The method of claim 2 further comprising the step of determining interconnections between devices of said current network prior to performing the step of establishing said local area network as said current network.

7. The method of claim 6 wherein the step of determining interconnections between devices of said current network comprises the steps of:

determining a network media that is associated with said current network;

selecting a sphere agent that corresponds to said network media;

causing said sphere agent to collect topology data from devices in said sphere; and collecting topology information from said sphere agent.

8. A method for determining interconnections between devices within a mixed-media network, the method comprising the steps of:

identifying a first set of devices which implement a first topology mechanism;

determining interconnections between the devices in said first set of devices using said first topology mechanism;

identifying one or more boundary devices that belong to said first set of devices;

identifying, based on information stored in said one or more boundary devices, one or more other sets of devices which implement topology mechanisms that are different from said first topology mechanism; and determining interconnections between devices in said one or more other sets of devices using topology mechanisms implemented by said one or more other sets of devices.

9. The method of claim 8 wherein:

the mixed-media network includes a frame switched network and a cell switched network;

the step of determining interconnections between the devices in said first set of devices is performed by determining interconnections between devices in said frame switched network; and the step of determining interconnections between devices in said one or more other sets of devices includes determining interconnections between devices in said cell switched network.

10. The method of claim 8 wherein the step of determining interconnections between the devices in said first set of devices using said first topology mechanism comprises transmitting special messages among devices that belong to said first set of devices.

11. The method of claim 10 wherein the step of determining interconnections between the devices in said first set of devices is performed without transmitting said special messages to devices that do not belong to said first set of devices.

* * * * *